(12) United States Patent
Andrsen et al.

(10) Patent No.: US 7,502,733 B2
(45) Date of Patent: *Mar. 10, 2009

(54) METHOD AND ARRANGEMENT IN A COMMUNICATION SYSTEM

(75) Inventors: Soren V. Andrsen, Stockholm (SE); Willem B. Kleijn, Trangsund (SE); Patrik Sorqvist, Huddinge (SE)

(73) Assignees: Global IP Solutions, Inc., San Francisco, CA (US); Global IP Solutions (GIPS) AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/822,378

(22) Filed: Jul. 5, 2007

(65) Prior Publication Data

US 2007/0260462 A1 Nov. 8, 2007

Related U.S. Application Data

(63) Continuation of application No. 09/498,398, filed on Feb. 4, 2000, now Pat. No. 7,321,851.

(30) Foreign Application Priority Data

Dec. 28, 1999 (SE) .................................. 9904812

(51) Int. Cl.
*G10L 21/00* (2006.01)
(52) U.S. Cl. ........................ 704/211; 704/201
(58) Field of Classification Search ................ 704/201, 704/211, 500
See application file for complete search history.

(56) References Cited

U.S. PATENT DOCUMENTS

| | | | |
|---|---|---|---|
| 5,018,136 A | 5/1991 | Gollub | |
| 5,115,429 A | 5/1992 | Hluchyj et al. | |
| 5,148,486 A | 9/1992 | Kudoh et al. | |
| 5,526,353 A | 6/1996 | Henley et al. | |
| 5,699,481 A | 12/1997 | Shlomot et al. | |
| 5,828,994 A | 10/1998 | Covell et al. | |
| 5,862,450 A | 1/1999 | Mandal et al. | |
| 5,864,682 A | 1/1999 | Porter et al. | |
| 5,907,822 A | 5/1999 | Prieto, Jr. | |
| 5,943,347 A | 8/1999 | Shepard | |
| 6,377,931 B1 * | 4/2002 | Shlomot | ...................... 704/503 |
| 7,321,851 B2 * | 1/2008 | Andrsen et al. | ............. 704/211 |
| 2002/0007273 A1 | 1/2002 | Chen | |
| 2005/0058145 A1 | 3/2005 | Florencio et al. | |

FOREIGN PATENT DOCUMENTS

EP 0459358 12/1991

OTHER PUBLICATIONS

Wasem, O.J., (1988), "The Effect of Wave Form Substitution on the Quality of PCM Packet Communications," IEEE Trans, on Signal Processing, vol. Sp-36, No. 3, pp. 342-348.*

(Continued)

*Primary Examiner*—Angela A Armstrong
(74) *Attorney, Agent, or Firm*—Birch, Stewart, Kolasch & Birch, LLP

(57) ABSTRACT

The present invention relates to the decoding/playback part of received sound data packets in systems for transmission of sound over packet switched networks. According to the invention, the lengths of received signal frames are manipulated by performing time expansion or time compression of one or more signal frames at time varying intervals and with time varying lengths of the expansion or the compression, said intervals and said lengths being determined so as to maintain a continuous flow of signal samples to be played back.

26 Claims, 12 Drawing Sheets

OTHER PUBLICATIONS

Kubin, g., et al., Time Scale Modification of Speech Based on a Non-linear Oscillator Model, IEEE, 1994, pp. I-453-456.*

-Wasem, O.J. et al., "The Effect of Wave form Substitution on the Quality of PCM Packet Communications," in: *IEEE Trans. Signal Proc.*, vol. SP-36, No. 3 pp. 342-348.

Kubin Gernot, et al., "Time Scale Modification of Speech Based on A Nonlinear Oscillator Model" in: *IEEE*, 1994 pp. I-453-456.

Sherif, M.H., et al., "Overview of Speech Packetization" in: *IEEE 1995 Symposium on Computers and Communications*, Jun. 1995, pp. 296-304.

* cited by examiner

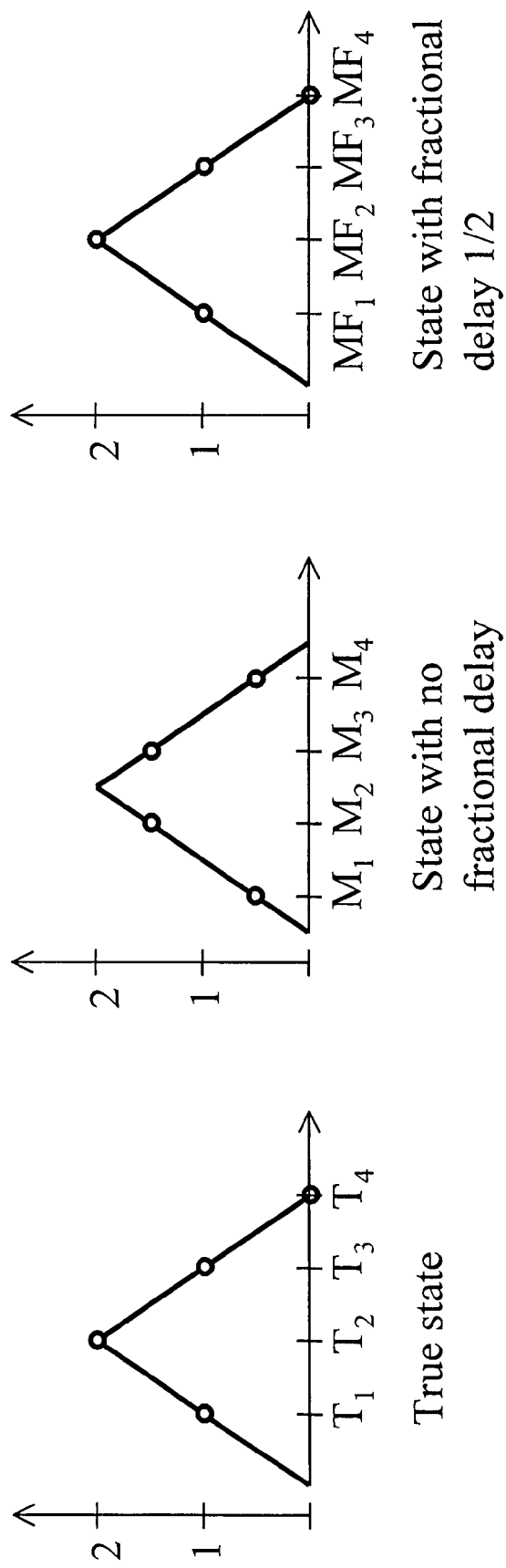

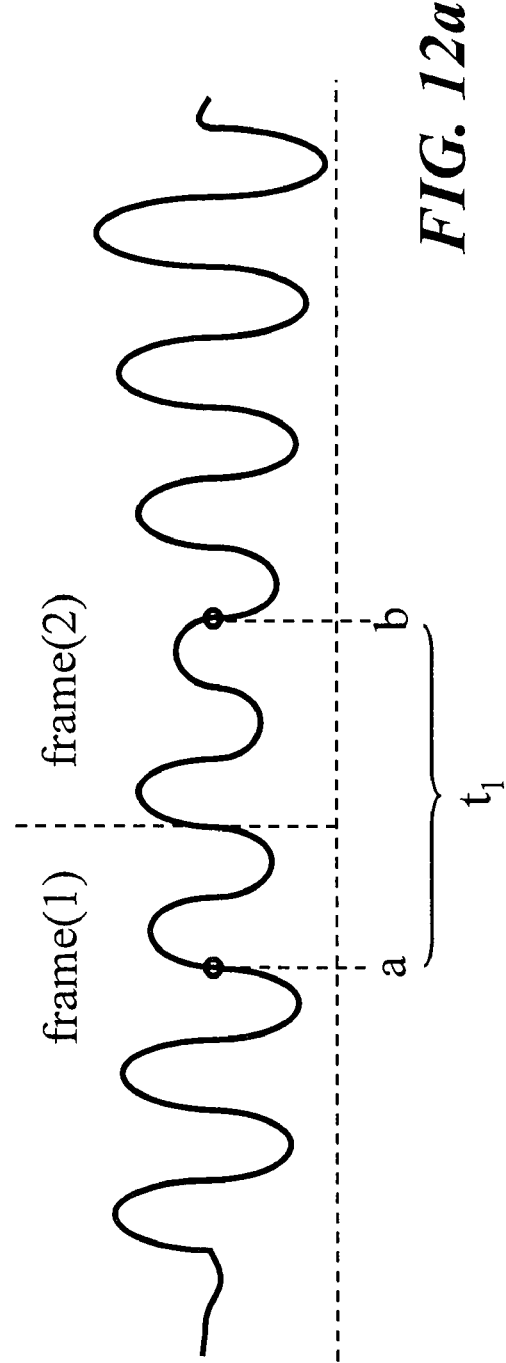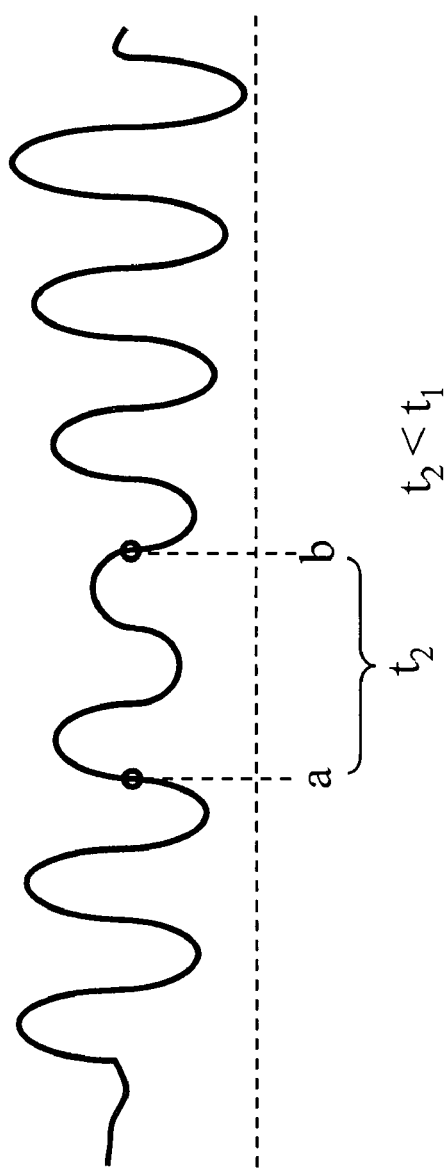

METHOD AND ARRANGEMENT IN A COMMUNICATION SYSTEM

This application is a Continuation of application Ser. No. 09/498,398 filed on Feb. 4, 2000, now U.S. Pat. No. 7,321,851 and for which priority is claimed under 35 U.S.C. § 120; and this application claims priority of Application No. 9904812-6 filed in Sweden on Dec. 28, 1999 under 35 U.S.C. § 119; the entire contents of all are hereby incorporated by reference.

TECHNICAL FIELD OF THE INVENTION

The present invention is generally related to systems for transmission of sound over packet switched networks, and more specifically to the decoding/playback part of received sound data packets in such systems.

TECHNICAL BACKGROUND AND PRIOR ART

In packet switched data networks, such as the Internet, the arrival time of data packets is subject to significant delay jitter. Moreover, data packets can be lost in the transmission or deliberately discarded by the network in order to resolve congestion problems. For data transmissions without strict requirements on the transmission time, an error-free transmission can be established with a transmission protocol that uses hand shaking and retransmission.

When sound signals such as speech or audio are transmitted over a packet switched network, signal frames, i.e. consecutive sets of signal samples, are encoded to result in data packets, each data packet corresponding to one or multiple signal frames. In, e.g., duplex communication systems, these signal frames are to be played back at the receiver side without excessive delay. In this case, a transmission protocol with hand shaking and retransmission is most often not a feasible solution to ensure signal frames to be available for continued playback.

Furthermore, delay jitter is a source of problems for these signals: if the delay of a data packet results in it arriving too late for continued playback of consecutive signal frames, then problems arise that are similar to those that occur when the data packet was lost.

Packet transmission of speech has long been an important application for packet switched networks. Most solutions to the delay jitter and lost packet problems have been proposed in connection with packet transmission of speech. Traditionally, the delay jitter problem is reduced by use of a so-called jitter buffer. In the jitter buffer, incoming packets are stored and forwarded in the correct order to the decoder and playback device. The jitter buffer is configured to give a useful compromise between delay of playback and the number of lost/delayed packets. In this setting there are two problems to solve:

(a) How do we continuously keep the jitter buffer in good operating conditions, i.e., how do we ensure short playback delay while minimizing the amount of packets that are received too late for playback?

(b) What do we do when a data packet is lost or delayed beyond the buffering delay?

We term the first problem (a) the timing problem, and refer to methods that address the first problem as timing recovery methods. We term the second problem (b) the lost frame problem and refer to methods that address the second problem as lost frame substitution methods. State-of-the-art methods for solving these two different problems will be described below.

While addressing timing recovery and lost frame substitution in connection with packet switched transmission of sound, the present invention, or rather an embodiment thereof makes use of, and refines, another method originally proposed for a different problem: oscillator modeling for time-scaling of speech. This method will be summarized below.

The known methods mentioned above employ techniques for merging or smoothing of signal segments to avoid discontinuities in the sound for playback. Since equal or similar techniques are employed by the present invention, techniques for merging or smoothing will be described below.

I. Timing Recovery Methods

A good compromise for the configuration of the jitter buffer is a function of the statistics of the delay jitter. Since the jitter is time varying, the jitter buffer is often continuously configured during a transmission, e.g., using the first one or two data packets of every talk spurt, or from delay statistics estimated from the previous talk spurt.

In a system that does not transmit data packets during silence, the jitter-buffer will empty as a natural consequence, and a sufficient buffering delay needs to be introduced at the beginning of each new talk spurt. The introduction of a parity bit in each data packet and the change of its value from one talk spurt to the next, allows the immediate detection of the beginning of a talk spurt in the receiver. Thereby, the start of playback of this talk spurt can be delayed with an interval called the retention delay. This allows the jitter buffer to recover from the underflow to good operating conditions.

At a sudden increase of the transmission delay, there is the risk that an underflow of the jitter buffer occurs. That is, no data packets are available in the jitter buffer at the required time of decoding to yield the signal frame for continued playback. In this situation, a repeated playback of the signal frame encoded in the last data packet in the jitter buffer may allow the buffer to recover to good operating conditions. In systems with speech encoding and decoding, the repeated playback may be accomplished by holding some input parameters constant to the speech decoder. In simpler systems, the repeated playback will mean a simple repetition of the signal frame. U.S. Pat. No. 5,699,481, discloses a slightly more advanced method, here the signal is repeated in units of constant length, the length being preset in the system design.

A sudden decrease of the transmission delay may cause an overflow of the jitter buffer. Apart from implementation specific problems related to the device having sufficient capacity to store the additional packets, this situation is an indication that the system introduces excessive delay of the playback. Here, skipping the playback of certain signal frames, i.e. deleting or discarding these signal frames, can make the buffer recover to good operating conditions. Again, the method of U.S. Pat. No. 5,699,481 discards signal parts in units of constant length, the length being preset in the system design.

In systems for speech transmission that transmit excitation frames being input into a linear predictive coding (LPC) filter, the repetition or deletion of signal frames can advantageously take place in the excitation domain, for example as disclosed in U.S. Pat. No. 5,699,481. Furthermore, for speech specific applications, it is advantageous to let rules for deletion and repetition of signal frames be dependent of a classification of the non-silent signal frames as voiced or unvoiced. Since a repetition or deletion of sub-frames of fixed length can lead to severe degradation of the voiced speech, the implementation in U.S. Pat. No. 5,699,481 does modification only of unvoiced and silence speech frames.

In addition to delay jitter in the transmission, also differences between clocks in the transmitting and receiving devices may cause buffer under- or overflow. A problem that is solved by the present invention, but also by the prior art. The present invention, however, providing a better quality of the resulting played back sound signal.

II. Lost Frame Substitution Methods

Methods have been developed for the situation in which data packets are lost, meaning that they were either discarded by the network, or reached the receiver later than required for the continued playback of the corresponding signal frame, despite a jitter buffer in good operating state. The methods used for this situation can, in general, be characterized as ways of substituting the lost signal frame with an estimate of this signal frame given signal frames earlier and, in some cases, later in the signal. The simplest of these methods is a direct repetition of the previous signal frame.

A more advanced method is a method that estimates a linear long-term predictor, i.e., a pitch predictor on the previous signal frames, and lets a long-term pre-diction with same length as a signal frame constitute the estimate of the lost signal frame.

A third method involves a target matching with the L last samples of the last signal frame being the target segment, where L is an integer. The method then searches for the L-sample segment earlier in the signal that best matches this target and let the frame substitution be samples following this L-sample segment (eventually scaled to give same summed-squared value as the latest signal frame. Since, for a complete frame substitution, the same number of samples as the frame length needs to be estimated, some methods consider squared-error matching of the target only with L-sample segments that are at least one frame length back in the signal, i.e., segments in the second to last signal frame and back.

The L-sample target matching can, at the cost of additional delay, be employed also for the estimation of the lost signal frame from signal frames later in the signal. A refined estimate for the lost signal frame may then result as a smooth interpolation between the estimate from previous signal frames and the estimate from later signal frames.

Examples of the methods described above are disclosed in "The Effect of Waveform Substitution on the Quality of PCM Packet Communications", O. J. Wasem et al., IEEE Trans. Signal Proc., vol. SP-36, no. 3, pp. 432-448, 1988.

III. Oscillator Model for Time-Scaling of Speech

In "Time-Scale Modification of Speech Based on a Non-linear Oscillator Model", G. Kubin and W. B. Kleijn, in *Proc. Int. Conf. Acoust. Speech Sign. Process.*, (Adelaide), pp. 1453-1456, 1994, which is hereby incorporated by reference, an oscillator model for time scaling is proposed. In the oscillator model, short fixed length segments of a signal are attached to a state vector of samples with fixed positive delays relative to the first sample in the segment. The oscillator model defines a codebook of short signal segments. To each signal segment in this codebook, a state vector is connected.

If for a finite signal defined as the concatenation of short segments, the codebook of the oscillator model contains all these short segments and their corresponding state vectors. Then, starting with the state of the first short signal segment, the oscillator model can for any real world signal without error regenerate the original signal segment by repeated read-out of a next short signal segment.

For a signal of infinite length, the oscillator model can regenerate the original signal without error from the state of the first short segment. This is obtained by periodically updating the codebook to correspond to finite sub signals. Time-scaling follows when, without changing the size or content of the codebook, we alter the rate of update for the codebook. A faster update rate results in a time-scaling less than one, and a slower update in a time-scaling larger than one. This was the application of the oscillator model proposed in the article referred to above.

IV. Merging and Smoothing

To improve the transitions from a signal frame to the substituted frame and from the substituted frame to the following signal frame, the article by O. J. Wasem et al. referred to above discloses the use of so-called merging, i.e., use of a smooth interpolation between the two signals in a short, but fixed (e.g. 8 samples), transition region.

In the article "Time-Scale Modification of Speech Based on a Nonlinear Oscillator Model" referred to above, the authors propose the use of linear predictive smoothing in order to reduce similar transition regions. In that context, linear predictive smoothing is obtained as follows: the estimate of the signal continuation is filtered through an LPC analysis filter to result in a residual signal. The analysis filter is initialized with a filter state obtained from the state codebook of the oscillator model. A refined estimate of the signal continuation is obtained by LPC synthesis filtering of the residual signal, with the synthesis filter initialized with a state consisting of the last samples in the signal prior to the continuation.

In the context of smoothing, it can be noted that the speech-specific timing recovery disclosed in U.S. Pat. No. 5,699,481, doing repetition or deletion of signal sub-frames with a fixed length in the excitation domain of a CELP (Code Excited Linear Prediction) coder, exploits linear predictive smoothing to improve transitions between signal sub-frames.

Thus, in short, state-of-the-art methods for timing recovery and lost frame substitution consist of:

Methods, exclusively for timing recovery, which modify the timing by repetition or deletion of signal frames or sub-frames, which are a fixed, predetermined number of samples long. Linear predictive smoothing is introduced as a result of processing in the excitation domain of a CELP coder. No signal fitting or estimation optimization, such as target matching or correlation maximization, is exploited in these methods.

Methods, exclusively for lost frame substitution, that substitute lost signal frames with estimates that are equal in length. These methods do not change the timing. They exploit signal fitting or estimation optimization such as vector matching or correlation maximization as well as overlap-add merging.

SUMMARY OF THE INVENTION

An object of the present invention is to enable a continuous play back of signal samples at a receiver end when receiving a digitized sound signal in the form of data packets from a packet switched network.

Another object is to provide a better quality, as interpreted by a listener, of the play back of the digitized sound signal received as data packets, in comparison with the quality of such play back accomplished with the presently known techniques.

According to the present invention, said objects are achieved by a method, use of an oscillator model, a program storage device and an arrangement, all of which are different aspects of the present invention, having the features as defined in the appended claims.

The present invention is based on the idea of performing time expansions and/or time compressions of signal frames, rather than performing repetitions or deletions of complete signal frames or of units of signal frames having a predefined length. This means that if there is a need to repeat a part of the signal, the length of the repeated signal part can be made smaller or larger than a signal frame. Correspondingly, if there is a need to delete a part of the signal, the length of the deleted signal part can be made smaller than a signal frame. Moreover, the time duration of the repeated or deleted signal part is varied over time, i.e. the invention provides a time varying length of the time expansions or the time compressions. Consequently, the intervals with which time expansions or time compressions are performed are varied over time and related to lengths of the time expansions or the time compressions. Thus, the time expansions and the time compressions of signal frames are performed on an asynchronous basis, since the length of the expansions/compressions and the length between different expansions/compression vary over time.

According to an embodiment of the invention, the lengths of the time expansions or time compressions are results of signal fitting, such as vector matching or correlation maximization, on the signal. As a result, the time intervals at which time expansions or time compressions are performed will typically change over time in dependence on the resulting lengths of the time expanded or time compressed signal frames.

Preferably, the length of a time expansion or a time compression is defined with a resolution of a sample or a fractional part of a time duration between two consecutive samples. This generally allows for very small or zero discontinuities at the boundary between a signal frame and its expansion. The fractional resolution is feasible to achieve by re-sampling the original signal, at the same sampling rate but at new time instances, and thereby obtaining new samples that are fractionally delayed relative to the samples of the original signal, i.e. each sample is delayed with a time duration that is less than the time duration between two consecutive original samples.

It is preferred to base the decisions to do time expansions and time compressions on real-time observations and statistics from the jitter buffer. These real-time observations and statistics, which are observed when monitoring the jitter buffer, contain, for example, the number of data packets in the buffer, the short and long term variation of packets in the buffer, and the short and long term percentage of lost packets.

Preferably, whenever a number of consecutive signal frames are available at the decoder, where the number of frames is time dependent, and based on the real-time statistics from the jitter buffer, a compression of two or more frames is attempted. This may or may not lead to a compressed signal frame that is shorter than the sum of the lengths of the signal frames input to the compression. The difference in length may be a fractional number of samples and is dependent on signal fitting of the actual signal frames. If the signal fitting cannot produce a compressed signal frame with smooth transitions, as defined by a threshold in e.g. a correlation measure or a vector matching, the signal frames are left unchanged. This threshold is advantageously adapted over time to allow for a less critical criterion for the compression the closer the jitter buffer is to overflow. Moreover, the threshold can vary in dependence on a classification of the signal frames. For speech, signal classes with different thresholds for compression would typically be: voiced, unvoiced, transition, and silence. This setup allows for some signal classes to be compressed only when the jitter buffer is very close to overflow, whereas other signal classes are compressed even at normal operation conditions for the jitter buffer leading to a reduction of the delay of playback.

It is preferred to invoke the frame expansion in any one of the following situations: underflow of the jitter buffer, close-to underflow of the jitter buffer, late arrival of data packets in the jitter buffer, and lost data packet. At the invocation of the frame expansion, no explicit decision about the occurring situation needs to be made. The expansion is iterative as follows. At each iteration, the signal frame is expanded with a signal dependent, and possibly fractionally accurate, number of samples. These samples are a, sometimes gain-scaled, version of the trailing part of the last frame. Towards the end of the playback of these expanded samples, where the time is based on the decoder processing time, the jitter buffer is checked to see if good operating conditions have been restored, i.e., that the jitter buffer is no longer in underflow or that a late data packet has arrived.

If good operating conditions have been restored, the playback can continue with no discontinuity at the boundary between the expanded signal frame and next signal frame. This holds since each iteration of the frame expansion produces a, sometimes gain-scaled, version of the trailing part of the last expanded frame; from there a transition to next signal frame can always be made without discontinuities by help of a smooth gain scaling of the next signal frame.

Otherwise, if the late data packet still has not arrived to the jitter buffer, and if any data packet following the late data packet has arrived to the jitter buffer, the signal frame corresponding to said late, and absent, data packet can be declared lost. The frame expansion, which at this point already has been partly played back, will in this situation in fact be a lost frame substitution.

The substitution for a lost signal frame is for the first part equal to a time expansion of the prior signal frame: a lost frame situation is not distinguished from a buffer underflow, close to buffer underflow, or late data packet situation, until a predefined number of signal frames, e.g. one, belonging to the future of the signal, with respect to the frame currently being played back, are (is) available at the receiver. The length of a substitution frame is not fixed to the length of the signal frames in the transmission system. Instead, the length of the substitution frame is chosen such that a smooth transition to a following frame can be made. This choice is based on signal fitting, such as vector matching or correlation maximization, the result can be a length of the substitution frame specified with an accuracy of a fraction of a sample.

In the substitution of a lost frame not only the previous frame can be expanded, but also the next frame can be expanded prior to merging the two frames.

It should be noted that the frame substitution can become not only longer, but also shorter than the length of a signal frame of the packet transmission system, with differences specified in a number of fractions of the delay between two consecutive samples. Therefore, according to the invention, this frame substitution technique relies on co-operation with the timing recovery technique described. Also, a decision as to whether processing is performed due to a timing recovery situation or a lost data packet situation is delayed until the end of the actual situation of the two, the leading parts of the processing performed in the two different situations being the same.

The iterated vector matching for the frame expansion in accordance with the present invention can be seen as an application of oscillator modeling. In this respect, the invention introduces four new concepts to oscillator modeling. Each of these concepts makes a refinement of the oscillator modeling, and each concept improves the performance of the combined timing recovery and lost frame substitution in accordance with the invention. Furthermore, each concept may be exploited separately, or in combination with the others. The concepts are as follows:

- States of the oscillator codebook results from not only integer sample period delays but also fractional delays, i.e. delays with a resolution of a fraction of the time between two consecutive samples.
- The segments in the oscillator model have variable lengths and they all form a trailing or heading segment of the signal from which the oscillator model was build.
- The vector matching can advantageously exploit gain-scale matching.
- Periodicity of the iterated frame expansion is avoided by only using the same segment once for the expansion of a frame.

The inventive method is, according to another embodiment of the invention, compatible with both merging and predictive smoothing to reduce discontinuities. The choice of which is a trade-off between quality and computational complexity. Furthermore, both merging and predictive smoothing may be used at the same time, e.g., by merging in the excitation domain of certain encoding-decoding schemes.

With respect to merging, the present invention includes several different embodiments, each based on different inventive concepts:

According to one embodiment, when merging two segments by overlap-add, the segment latest in time is preferably time-shifted with a number, or fractional number, of samples, thus optimising a correlation or a vector matching criterion for the overlapping part of the two segments. Alternatively, merging can be made by replacement of the codebook in an oscillator model. Both of these merging alternatives, when applied in a lost frame substitution situation, rely on the presence of an efficient timing recovery, which, as described previously is included in the inventive method of the present invention.

According to another embodiment, the merging can advantageously optimize a correlation or a vector matching criterion when the segment latest in time is multiplied by a gain, which gain is a free parameter in the optimization. From there, a smooth transition back to unity gain can be obtained over the remaining part of the trailing segment or over the following signal frames.

According to the present invention, the method for manipulating the signal either operates on the decoded signal in time domain as a post-processing applicable to any encoding-decoding system, or on a time-domain signal that is intermediate in the decoding process of the signal, and specific to the encoding-decoding method applied. For some coding schemes, this operation on a intermediate time-domain signal enables smoothing across signal frames without additional computational complexity. Examples of intermediate time-domain signals, on which our method can be used, are the excitation signal in CELP decoders or those waveform-interpolation or sinusoidal coders that do synthesis filtering of an excitation signal. The method can be refined, using e.g. speech specific signal characteristics such as voicing, but the basic algorithm is developed without any source specific assumptions made about the signal; it may be any sound source, with speech and audio as examples.

BRIEF DESCRIPTION OF THE DRAWINGS

Further features and advantages of the invention will become more readily apparent from the appended claims and the following detailed description of a number of exemplifying embodiments of the invention when taken in conjunction with the accompanying drawings in which like reference characters are used for like features, and wherein:

FIGS. 11a, 11b and 11c are exemplifying diagrams illustrating how a fractional resolution is obtained; and FIGS. 12a and 12b are diagrams illustrating an exemplifying time compression of two signal frames.

DETAILED DESCRIPTION OF PREFERRED EMBODIMENTS

Figure 1:
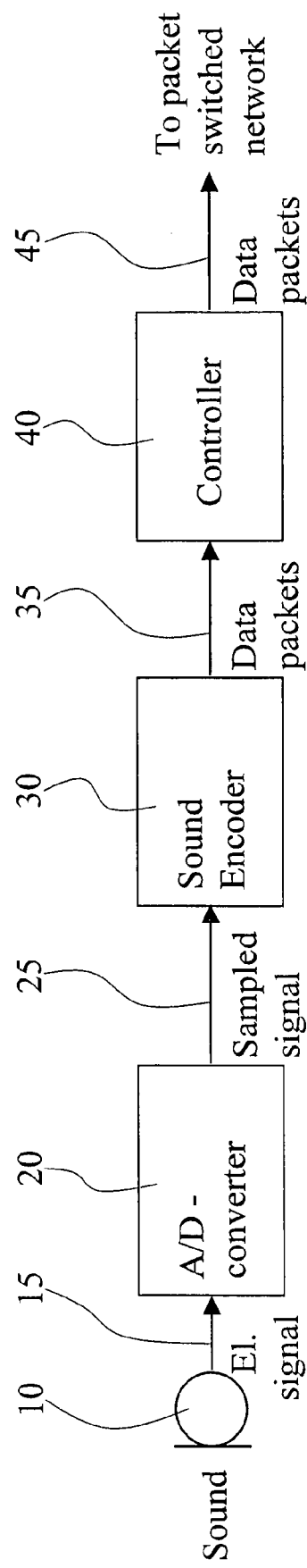
FIG. 1 shows an overview of the transmitting part of a system for transmission of sound over a packet switched network.

FIG. 1 is a block diagram of the transmitting part of a system for transmission of sound over a packet switched network. The sound is picked up by a microphone 10 to produce an electric signal 15, which is sampled and quantized into digital format by an A/D converter 20. The sample rate of the sound signal is a rate that is adequate for the bandwidth of the signal and is typically 8, or 16 kHz for speech signals and 32, 44.1 or 48 kHz for audio signals. The quantization accuracy of the digital representation is an accuracy that is adequate for the desired quality of the transmission, and is typically 7 or 8 bit A- or μ-law quantization, or, 13 or 16 bit uniform quantization. Alternatively, the A/D converter 20 is of the oversampled differential quantization type. The sampled signal 25 is input to a sound encoder 30. The sound encoder 30 produces data packets 35 with fixed or variable rate and with fixed or variable size. These data packets contain sufficient information for an adequate sound decoder to reproduce a sound signal that is a sufficient-quality reproduction of the original sound signal. The controller 40 adds sequencing and destination address information to these packets, resulting in new data packets 45 suitable for transmission over a packet switched network.

Figure 2:
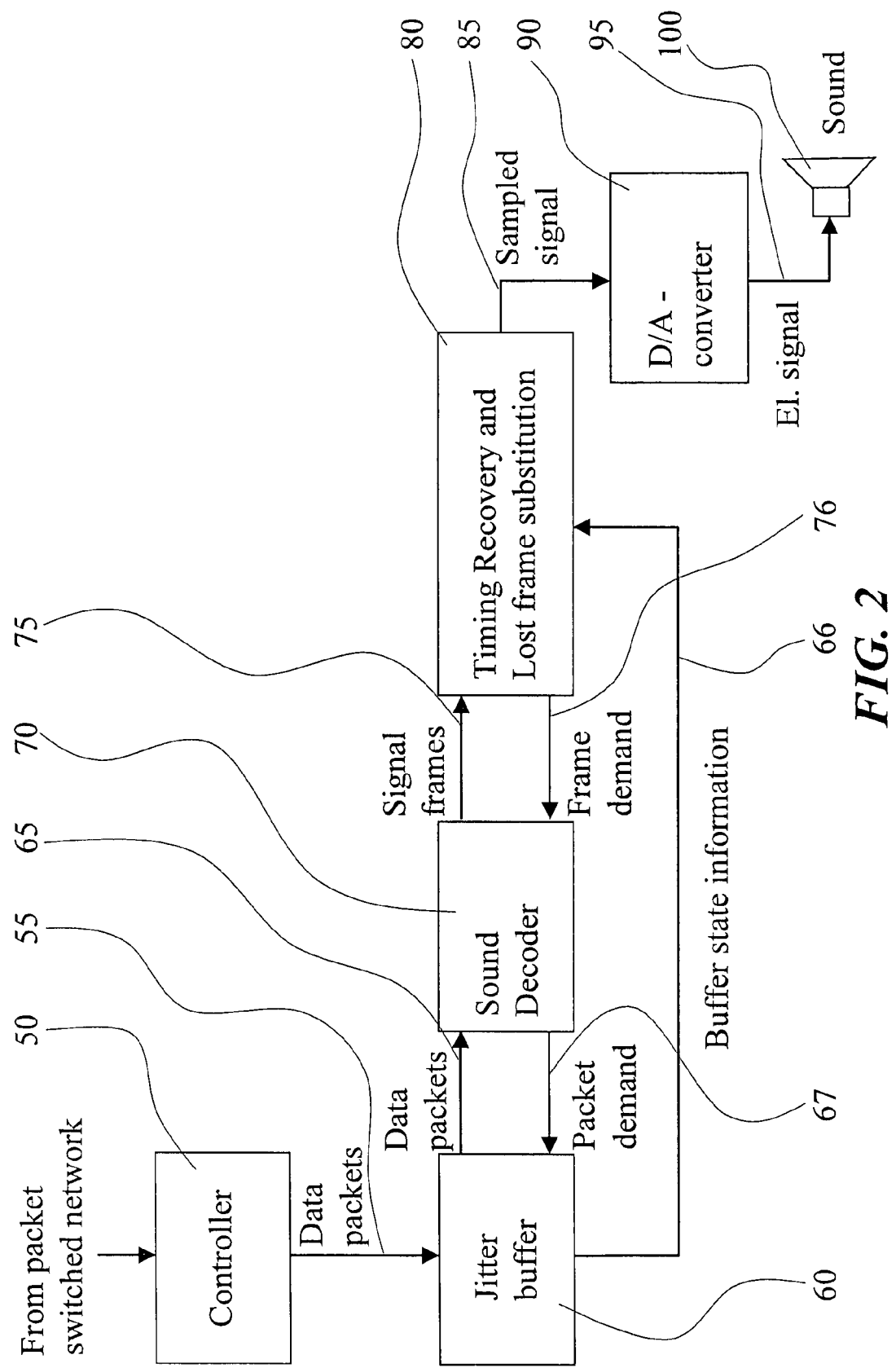
FIG. 2 shows an overview of the receiving part of a system for transmission of sound over a packet switched network in accordance with an embodiment of the present invention. The system employ combined timing recovery and lost frame substitution on the decoded signal frames.
Figure 3:
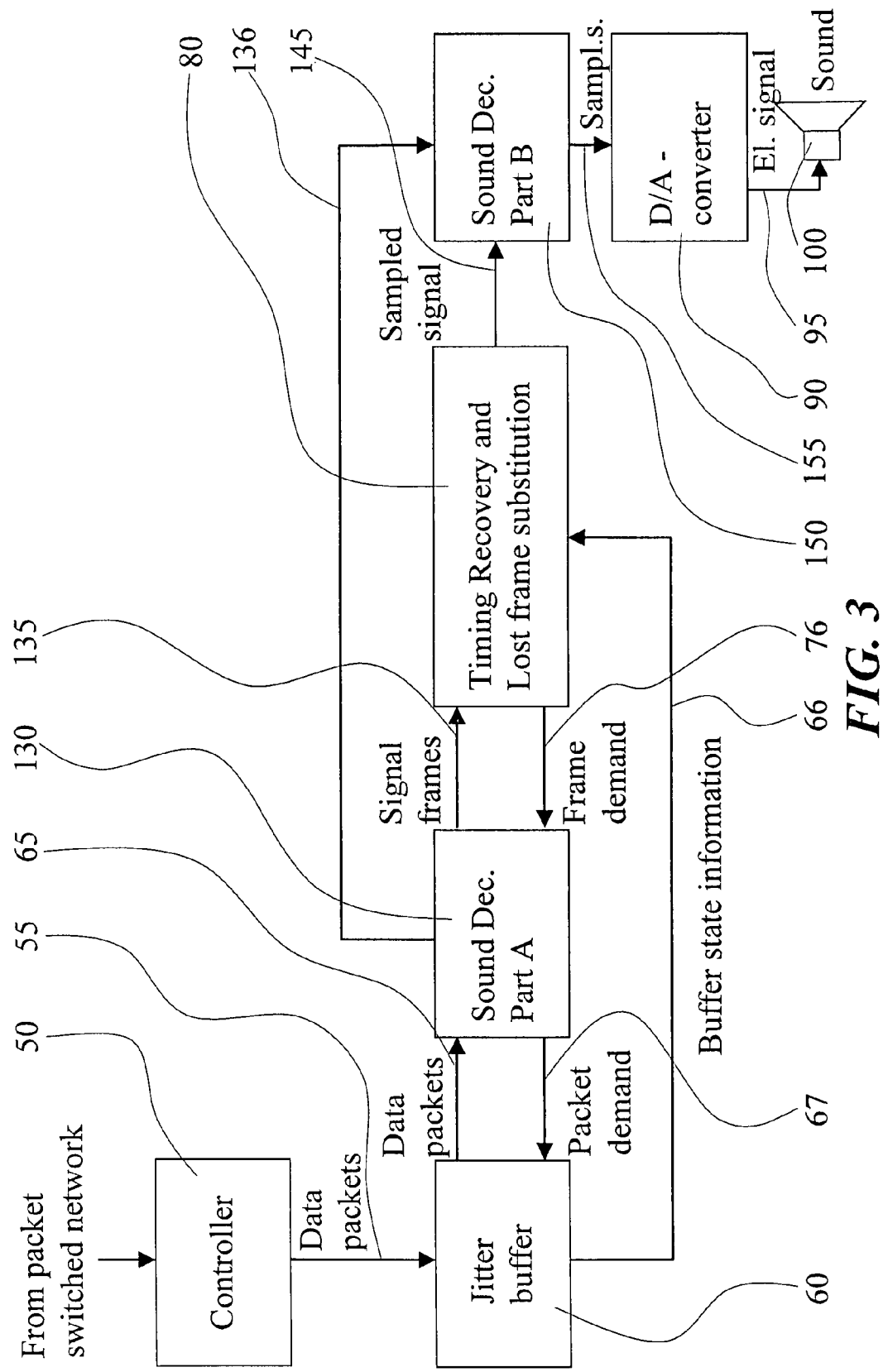
FIG. 3 shows an overview of the receiving part of a system for transmission of sound over a packet switched network in accordance with another embodiment of the invention. The system employ combined timing recovery and lost frame substitution on time-domain signal frames that are intermediate in the sound decoding.

In FIG. 2 and FIG. 3, two different embodiments of the present invention are shown. Both embodiments show a receiving part of a system for transmission of sound over a packet switched network. The difference between the two embodiments of FIGS. 2 and 3 lies in the position of the combined method for timing recovery and lost frame substitution 80. In both systems a controller 50 receives data packets from the packet switched network, strips addressing information and places the data packets adequately in a jitter buffer 60. The jitter buffer 60 is a storage medium, typically RAM, with a limited physical capacity. According to the invention, the receiving system keeps the number of data packets in the jitter buffer 60 low but nonzero, thereby reducing the delay in the system, by way of regulating the rate by which data packets 65 exit the jitter buffer 60. The amount of packets in the jitter buffer 60 will typically be one to four packets. This number is dependent on the parameterization of the invention, to be described later. In order to obtain good operation of the overall system, it is important that the physical capacity of the jitter buffer 60 is such that all incoming data packets 65 can be stored, i.e. so that overflow of the time regulated system never occurs. The timing recovery and lost frame substitution 80 outputs a regularly sampled sound signal 85, typically with the same sample rate as the sampled signal 25 in FIG. 1, except for differences in transmitting and receiving clocks.

In the embodiment illustrated in FIG. 2, a sound decoder 70 decodes data packets 65 into signal frames 75, i.e., fixed length segments of the decoded sound signal. These signal frames 75 are input to the combined timing recovery and lost frame substitution 80. The sound decoder 70 works as a translator through which the timing recovery and lost frame substitution 80 can access data from the jitter buffer 60 in the form of a signal frame 75. That is, the timing recovery and lost frame sub-stitution 80 makes a frame demand 76 from the sound decoder 70. This causes the sound decoder to make a packet demand 67 from the jitter buffer 60. The jitter buffer 60 extracts a data packet 65 and sends it to the sound decoder 70, which decodes it, and returns it as a signal frame 75. The decision by the timing recovery and lost frame substitution 80 to fetch a signal frame is based on additional buffer state information 66 in a way to be described later.

In the embodiment illustrated in FIG. 3, the sound decoder 70 of FIG. 2 has been replaced by a partial sound decoder 130. The partial sound decoder decodes the data packets 65 into signal frames 135 of an intermediate time-domain signal 145. These signal frames 135 are specific to the type of encoding-decoding system used. Typical examples of the signal frames 135 received by the timing recovery and lost frame substitution 80 are the excitation signal in CELP decoders or those waveform-interpolation or sinusoidal coders that do synthesis filtering of an excitation signal. The timing recovery and lost frame substitution 80 operating on these signal frames 135 can be equivalent in structure to the one shown in FIG. 2 operating on the signal frames 75 from the decoder 70 in FIG. 2, however, the choice of advantageous sub methods for expansion, merging, and smoothing can be different for the two embodiments. In correspondence with the description with reference to FIG. 2, the embodiment of FIG. 3 employs frame demand 76, packet demand 67 and buffer state information 66. The remaining part 150 of the sound decoding process is a mapping from the intermediate time-domain signal 145 to a regularly sampled sound signal 155, which compares to the sampled signal 85 of the embodiment described with reference to FIG. 2. This remaining part B 150 concludes the decoding process with the aid of side information 136 received from the partial sound decoder 130, i.e. the initial part A of the decoding process.

In both embodiments described above, with reference to FIG. 2 and FIG. 3, respectively, a D/A converter 90 converts the regularly sampled sound signal 85 and 155, respectively, to an analog electronic signal 95, which drives a sound reproducing system 100, e.g. a loudspeaker, to produce received sound.

An embodiment of the decision logic of the timing recovery and lost frame substitution 80 is described with reference to the flow charts of FIGS. 4, 5, 6, 7, 8, and 9. In the description below the notation $N_A(C)$ will be used, where N, depending on the context, indicates one of the following: a number of signal frames; an index number of a particular signal frame; a number of expansions of a signal frame; or a number of signal samples. The interpretation of a specific N will be clear from the context in which the specific N appears. C denotes the type of class of the signal frame for which the number N is relevant. The index following the N (e.g. written as $N_A$, $N_B$, $N_C$ and so on) is merely used for distinguishing different N:s from each other, since the N in one context is not the same N as in another context, i.e., for example, $N_A$ and $N_B$ are not related to each other.

Figure 4:
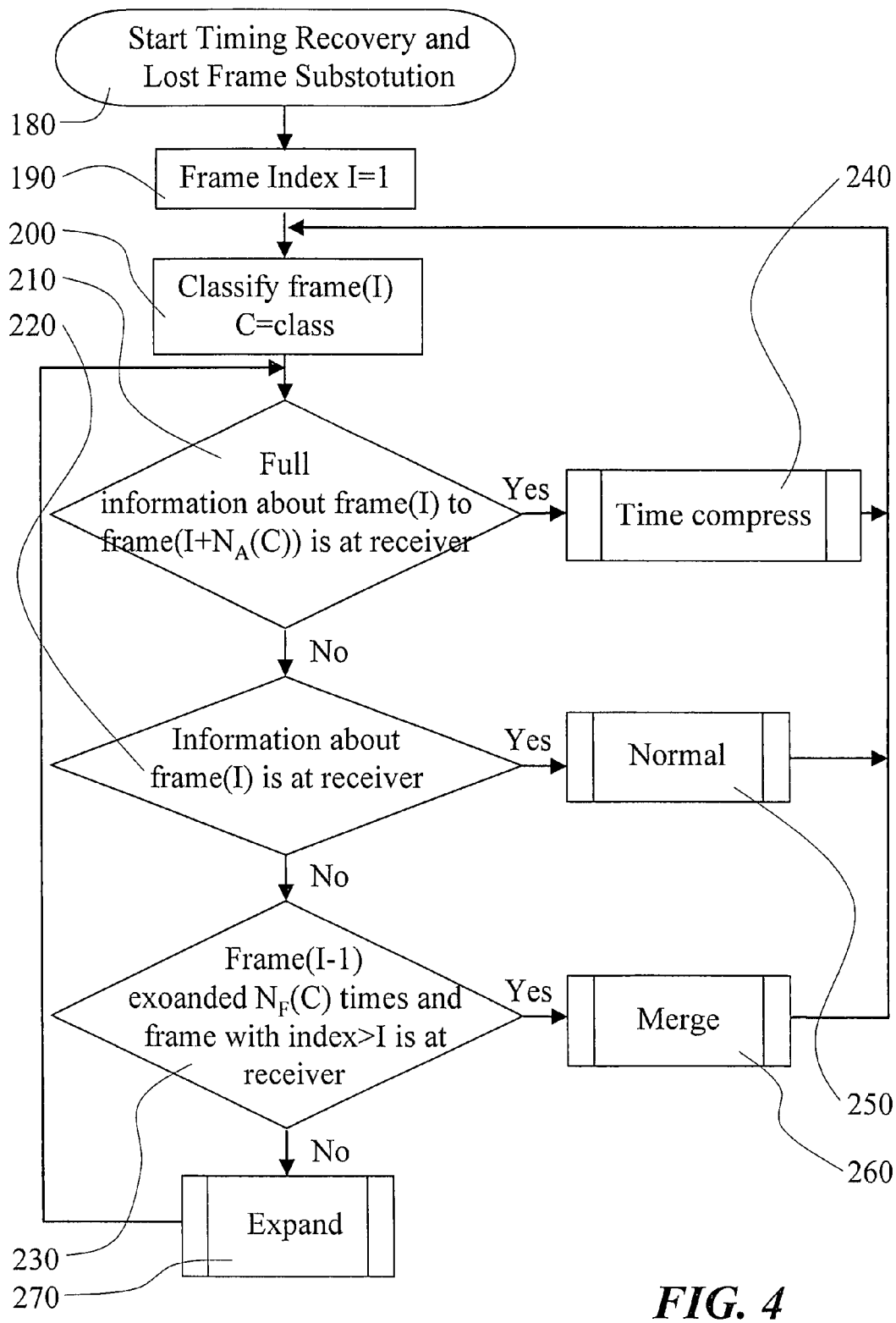
FIG. 4 is a flow chart illustrating the overall operation of the process for combined timing recovery and lost frame substitution in accordance with the embodiments referred to by FIGS. 2 and 3.

In FIG. 4, an overall flow chart of the decision logic in the timing recovery and lost frame substitution 80 of FIG. 2 and FIG. 3 is shown. As shown in the flow chart, the timing recovery and lost frame substitution is an iteration over a signal frame with index I. The iteration is started, 180, after a preset or adaptive number of frames are available in the jitter buffer in the beginning of a communication or talk spurt. Frame(I) is first classified 200 into one class C out of a number of classes. The class C influences the behavior of the remaining part of the method towards the signal frame. The advantageous choice of possible classes depends on the nature of the sound signal. For speech signals classification into silence, unvoiced and voiced signal frames is advantageous. Often this classification can be directly extracted from the data packet, i.e. the encoded signal frame, in a way known to a person skilled in the art. If desired, assumptions about the sound signal can be avoided by letting all signal frames belong to one single class, i.e., omitting block 200. Then, in block 210, if a class and time dependent number of consecutive frames, in simple implementation two frames ($N_A(C)=1$), are at the receiver, the time compression sub-process 240 is entered. The time dependency is based on the realtime statistics from the jitter buffer. Otherwise, it is checked, in block 220 whether at least the current frame, frame(I), is at the receiver. If this is the case, the normal sub-process 250 is entered. If this cannot be done, either the jitter buffer is in underflow, the packet is late, or it is lost. In the beginning, frame(I-1) should be expanded a number of times to give the frame(I) more chances to show up, each expansion being performed in block 270. After each expansion it is checked, also in block 270, whether frame(I) has arrived, in which case it is played back, otherwise, after $N_F(C)$ expansions, a decision is made in block 230 whether or not frame(I-1) should be merged with any future frame, including possible expansion of the heading part of this future frame, in addition to, or as an alternative to, expanding frame(I-1). The result of the merging decision leads to a call of either the merging sub-process 260 or the expand sub-process 270. A merge means that frame(I) has been deemed lost, and the frame index I increase with a number dependent on what nearest future frame was at the receiver, i.e. index I is incremented one or more times. From that frame the process is repeated, and the overall process flow is returned from block 260 to block 200, in which yet another classification is performed of the frame with the incremented index I. Alternatively, an expansion in block 270 leads to the output of a signal dependent number of samples at the end of the last frame, thereafter the overall process flow returns to block 210 where it is checked whether any signal frames have become available in the meanwhile.

Figure 5:
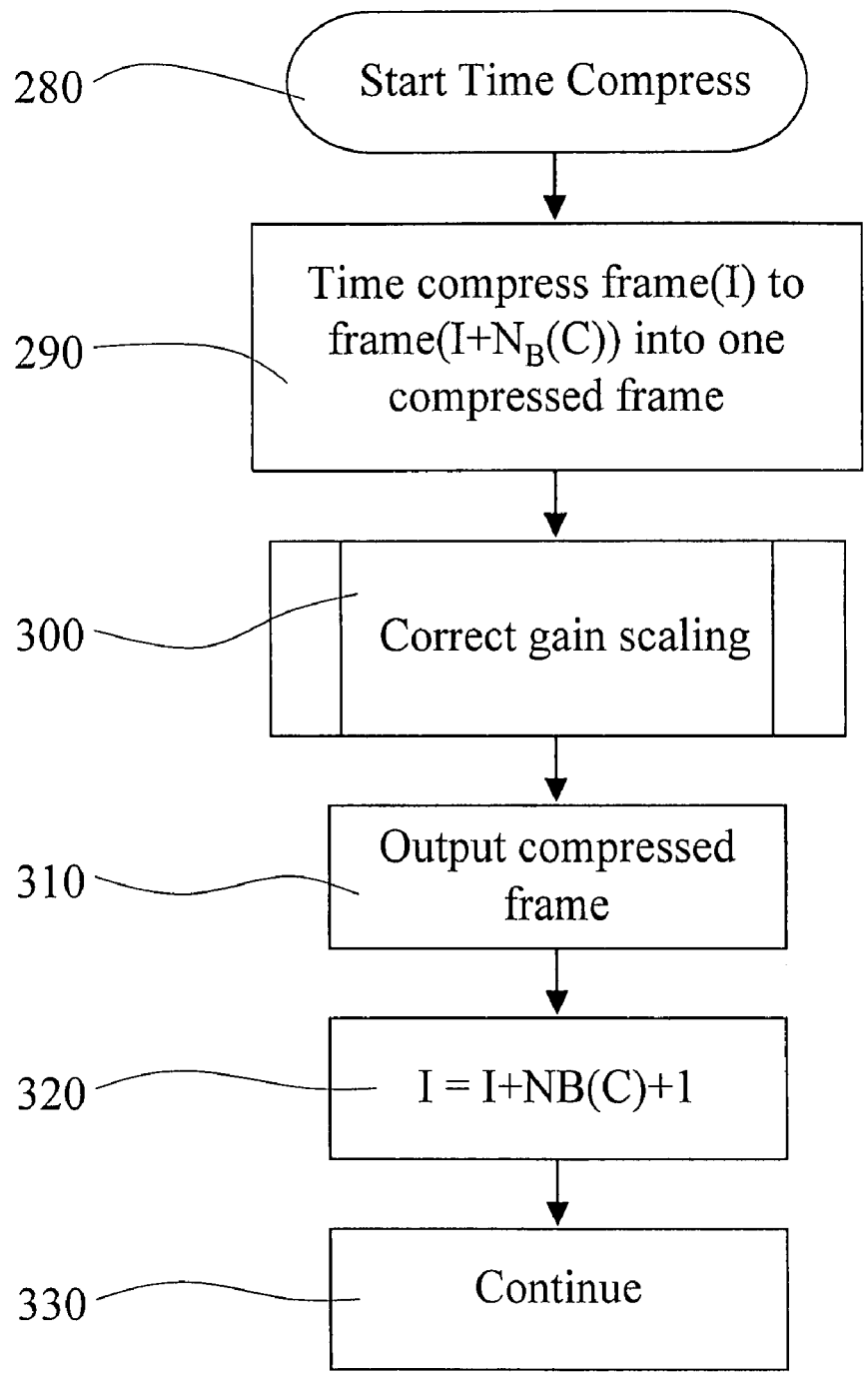
FIG. 5 is a flow chart of the sub-process for time compression of signal frames, referred to in FIG. 4 as the time compress sub-process.

FIG. 5 is a flow chart of the sub-process for time compression of signal frames, referred to in FIG. 4 as the time compress sub-process 240. This sub-process attempts time compression, in block 290, of a number of signal frames, frame(I) to frame(I+$N_B$(C)), with a class dependent threshold T(C). If the time compression does not meet a threshold condition, the time compression results in a simple concatenation of signal frames. The time compression is further described later in this specification. The resulting signal frame is then smoothly corrected in block 300 for a gain that may have been introduced by expansion or merging operations on earlier frames. Subsequently the time compressed signal frame is output in block 310, after which the frame index I is updated in block 320. An output operation implies that the decision logic waits for a time instant that depends on the number of samples output but is less than the time it takes for the D/A converter 90 to play these samples back. This is to ensure continued playback with nonzero processing times for the sound decoder 70 or 130, 150 and timing recovery and lost frame substitution 80. Block 330 indicates that the decision logic then continues with a new frame in FIG. 4, i.e. the sub-process flow returns to block 200 of the overall process flow in FIG. 4.

Figure 6:
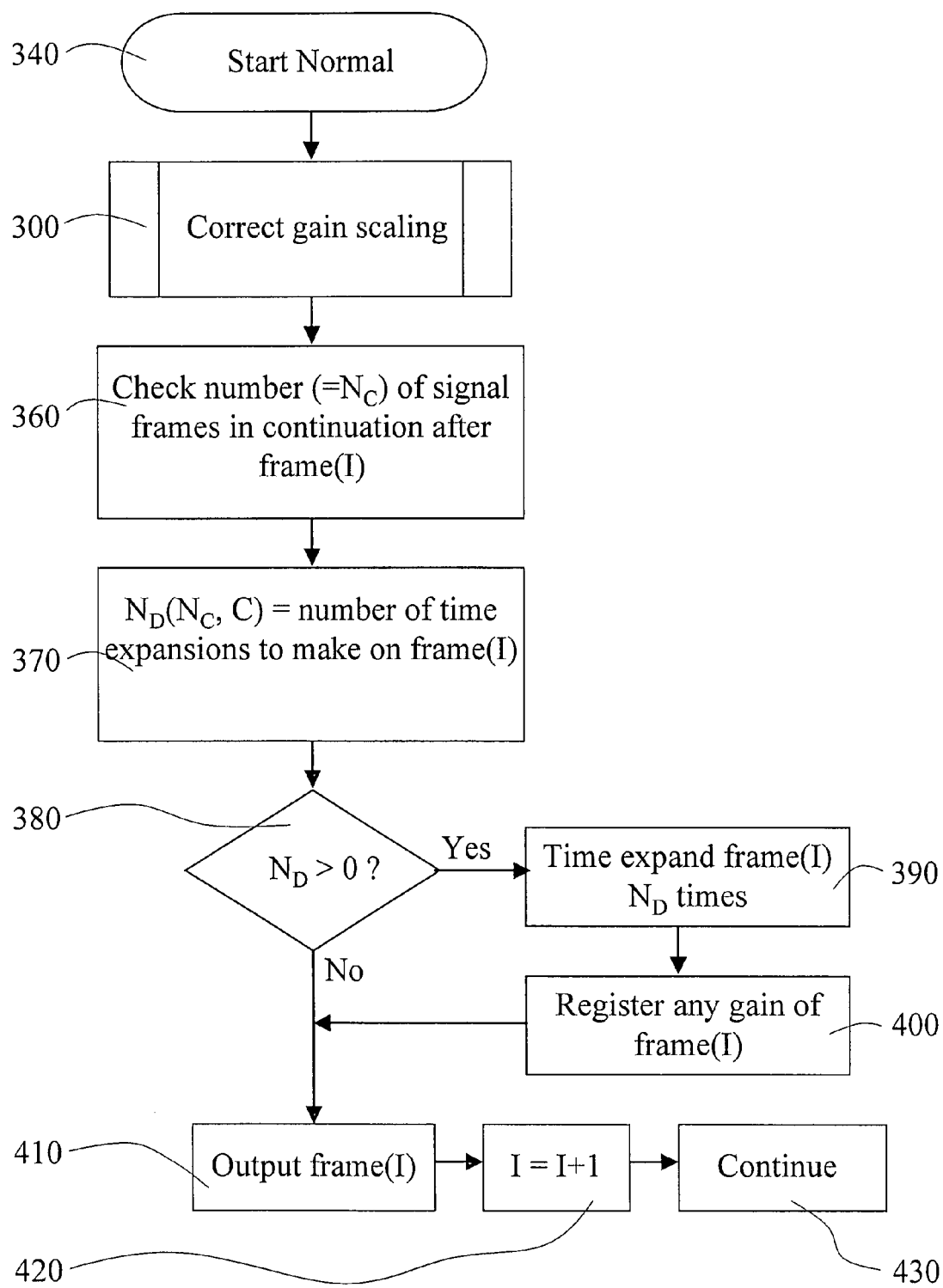
FIG. 6 is a flow chart of the sub-process for output of signal frames with normal consecutive sequence, referred to in FIG. 4 as the so called normal subprocess.

FIG. 6 is a flow chart of the sub-process for output of signal frames with normal consecutive sequence, referred to in FIG. 4 as the so called normal sub-process 250. This sub-process 250 starts with a smooth correction, using sub-process 300, of a gain that may have been introduced by expansion or merging operations on earlier frames. Always, when the normal sub-process is entered, frame(I) is at the receiver. This sub-process can by a choice of parameters be a simple output of frame(I). However it can in some cases be advantageous to let the output depend on a second look in the jitter buffer as follows: In block 360 the class C, the number $N_c$ of consecutive frames after frame(I) ready in the jitter buffer, and the jitter buffer statistics, are checked. Thereafter, in dependence on the mentioned checked parameters, the number $N_D$ of time expansions to make on frame(I) is determined in block 370. Then it is checked, in block 380, if this number $N_D$ is larger than 0. If it is not, frame(I) is not expanded, but directly outputted by block 410. If it is, frame(I) is time expanded $N_D$ times in block 390, and in block 400 it is registered whether the end of frame(I) have a gain different from one. Subsequently the expanded frame is output in block 410. After block 410 the sub-process flow continues to block 420, in which block the frame index is incremented. Block 430 indicates that the decision logic then continues with a new frame in FIG. 4, i.e. the sub-process flow returns to block 200 of the overall process flow in FIG. 4. More details on the expansion will be described later in the specification.

Figure 7:
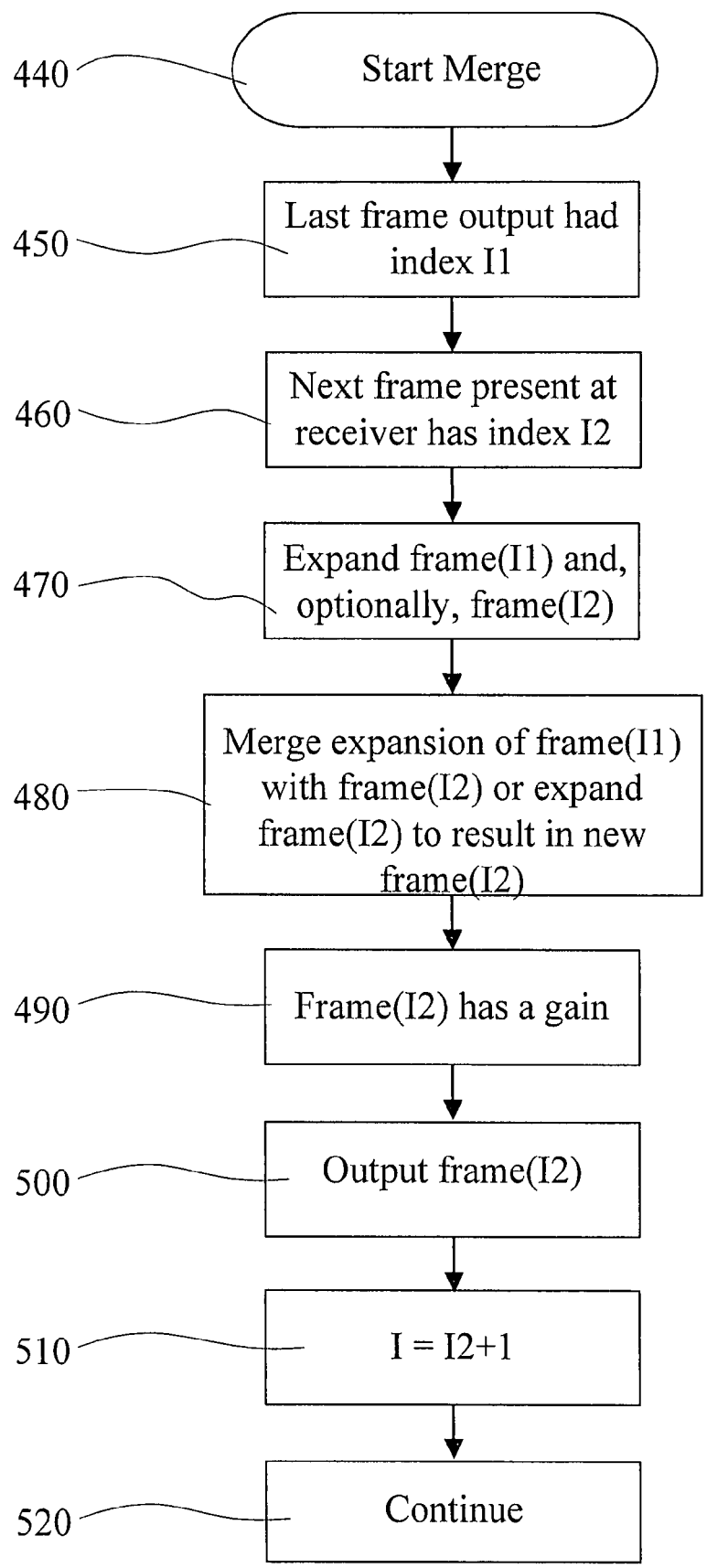
FIG. 7 is a flow chart of the sub-process for merging a signal frame expansion with a future, not consecutive, signal frame, referred to in FIG. 4 as the merge sub-process.

FIG. 7 is a flow chart of the sub-process for merging a signal frame expansion with a future, not consecutive, signal frame, referred to in FIG. 4 as the merge sub-process 260. In block 450 the last frame outputted is indexed with I1, and then, in block 460, the next frame at the receiver is indexed with I2. Then, in block 470, the last frame(I1) is time expanded using the same expansion process as in block 390 of FIG. 6. Alternatively, both frame(I1) and frame (I2) are time expanded using the expansion process 390. The expanded frame(I1) is then merged with frame(I2) in block 480, frame (I2) being either expanded or not expanded as indicated above. More details on merging will be described later. The merging of frame(I1) and frame(I2) leads to a merged, new frame(I2), which can have a gain different from one. The gain of the new frame(I2) is registered in block 490. The merged, new frame(I2) is then outputted in block 500, after which index I2 is incremented in block 510. Block 520 indicates that the decision logic then continues with a new frame in FIG. 4, i.e. the sub-process flow returns to block 200 of the overall process flow in FIG. 4.

Figure 8:
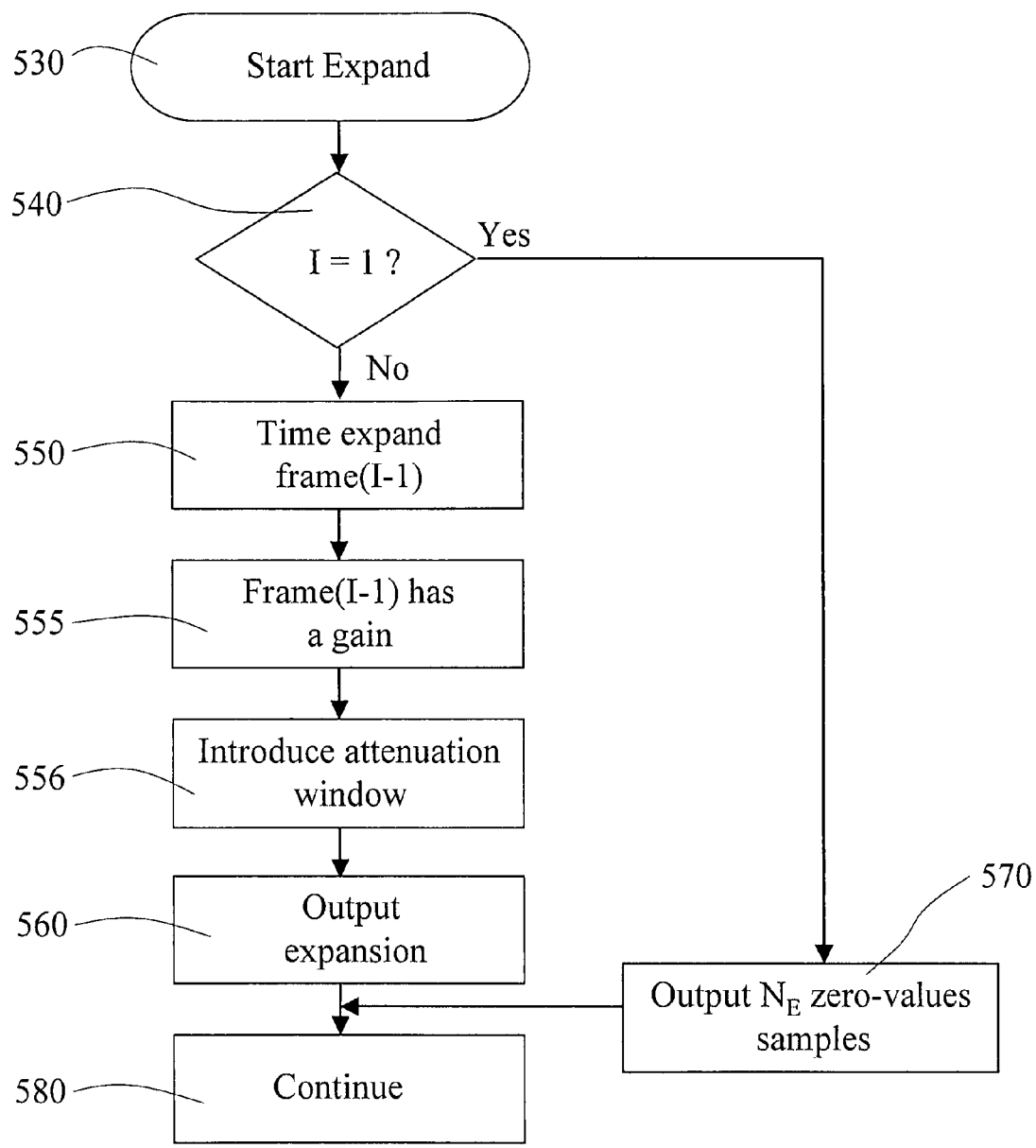
FIG. 8 is a flow chart of the sub-process for expansion of a signal frame and output of the obtained expansion, referred to in FIG. 4 as the expand sub-process.

FIG. 8 is a flow chart of the sub-process for expansion of a signal frame and output of the obtained expansion, referred to in FIG. 4 as the expand sub-process 270. First, in block 540, it is checked if we are waiting for the first signal frame(I) (expansion when index I equal one). If I equals one, a number $N_E$ of zero-valued samples are outputted in block 570, in order to let a signal frame arrive. If the frame number index I indicates that at least one frame has arrived, the following happens: frame(I-1) is time expanded in block 550, and then, in block 555, the gain at the end of frame(I-1), which gain can be different from one, is registered. In block 556, an attenuation window is introduced if consecutive expansions of the same frame has been done, the reason for this is to mute down the signal after some time if no new signal frames can be received from the jitter buffer 60. Then, in block 560, the expanded frame(I-1) is outputted. Finally, Block 580 indicates that the decision logic then continues with a new look in the jitter buffer 60, i.e. that the sub-process flow then returns to block 210 of the overall process flow in FIG. 4.

Figure 9:
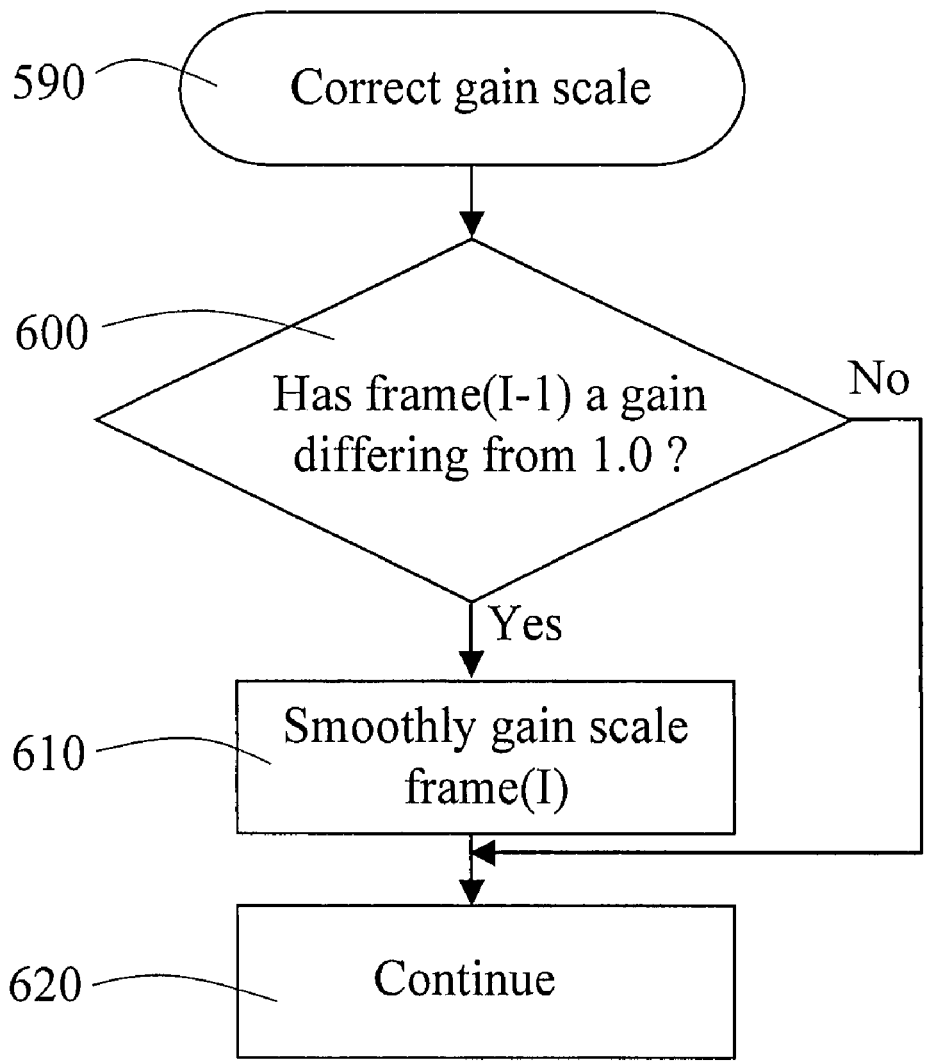
FIG. 9 is a flow chart of the sub-process for correcting the gain scaling of signal frames following an expansion or merging, referred to in FIG. 5 and FIG. 6 as the correct gain scaling sub-process.

FIG. 9 is a flow chart of the sub-process for correcting the gain scaling of signal frames following an expansion or merging, referred to in FIG. 5 and FIG. 6 as the correct gain scaling sub-process 300. First, in block 600, it is checked whether a gain different from the value 1.0 has been registered for frame(I-1). If this is the case, samples of frame(I) are multiplied with a factor, which factor at the beginning of the frame (I) equates with the gain of the end of frame(I-1), and which factor at the end of frame(I) equates with 1.0. For intermediate samples of the frame(I), a smooth inter-polation is performed between these factor values, i.e. beginning and end factor values. The described so called smooth gain scaling of frame(I) is performed in block 610. The sub-process then continues to block 620. If block 600 detects that no gain different from 1.0 has been registered for the frame, the sub-process continues directly to block 620. For long signal frames, e.g. 16 ms or more, the correct gain scaling sub-process is advantageously tageously performed in accordance with the description above. However, for shorter signal frames, it can be advantageous to have the gain return to 1.0 during a time span of more than one signal frame. This can be obtained by a modified smoothing function and by modifying the correct gain scaling sub-process of FIG. 9 to also multiply samples at the end of frame(I) with a factor being different from 1.0.

Figures 10A, 10B:
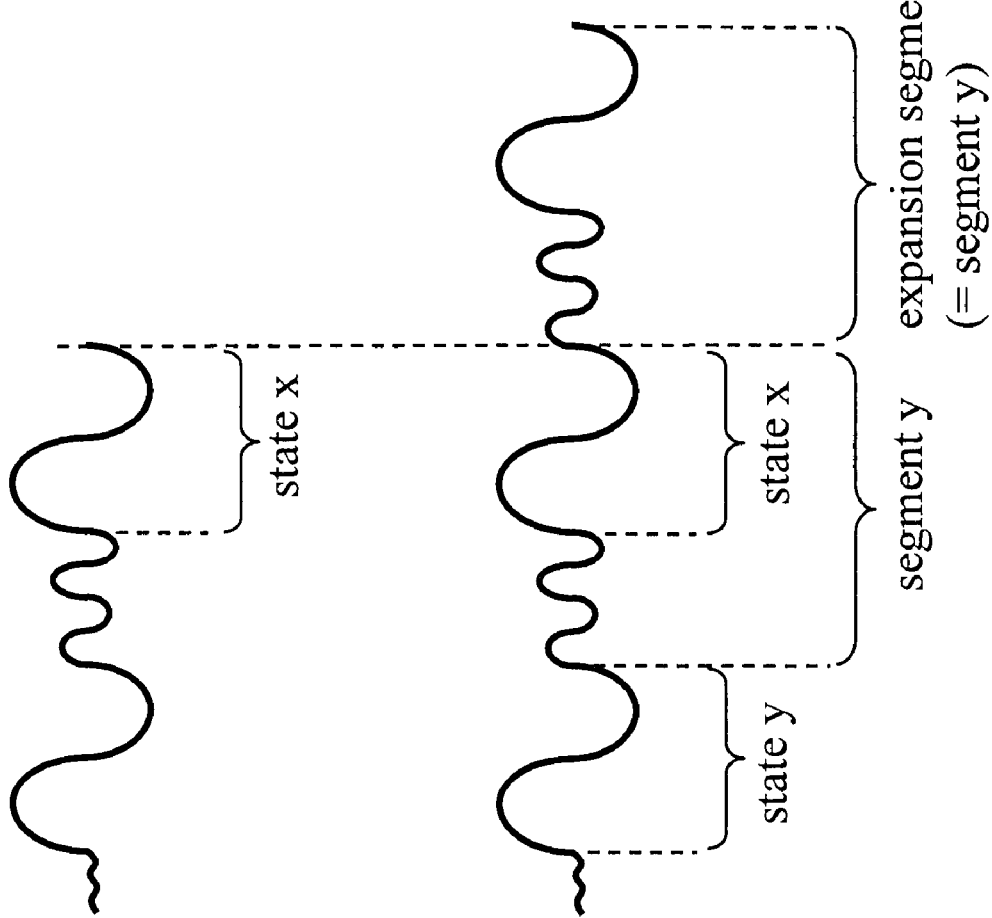
FIGS. 10a and 10b are diagrams illustrating an exemplifying time expansion of a signal frame.

FIG. 10*a* shows a diagram illustrating a trailing part of a signal frame to be time expanded. The last number of samples, within the region marked x, of the trailing part forms a state x, the so-called true state.

In FIG. 10*b* the trailing part of the frame of FIG. 10*a* is shown after that time expansion has been performed. The true state x has been matched against different states in the frame to be expanded, and state y of the frame has been found to provide an acceptable level of signal fitting with the samples of the true state x. The segment associated with state y, denoted segment y in FIG. 10*b*, has then been used as an expansion segment when time expanding the frame, i.e. the expansion segment of the frame is identical with segment y. Furthermore, the selected segment y has been chosen so as to have the samples of the true state x at the end. As a consequence, when using segment y as the expansion segment, there will be no discontinuities in the transition from the expansion segment to the following frame.

FIGS. 11a-11c are diagrams illustrating the concept of fractional resolution used by the present invention FIG. 11a shows a true state for which a matching state is to be found, the signal levels for samples $T_1$-$T_4$ of this true state can be seen on the y axis, i.e. 1, 2, 1, 0. Assume now that the best matching state is the state shown in FIG. 11b. The signal fitting when comparing the samples $T_1$-$T_4$ of the true state and the samples $M_1$-$M_4$ of the best matching state, having the signal levels ½, 1½, 1½, ½, will be far from perfect, for example if a mean square error is used as a measure on the signal fitting. However, by performing a re-sampling, states with a fractional delay of ½ may be obtained. After such a re-sampling, the state of FIG. 11b results in a state having a sample sequence as shown in FIG. 11c, i.e. samples $MF_1$-$MF_4$ having signal levels 1, 2, 1, 0. Thus, the signal fitting of the true state in FIG. 11a and the state in FIG. 11c having a fractional delay of ½ will provide a perfect match. FIGS. 12a and 12b are diagrams illustrating an exemplifying time compression of two signal frames. In FIG. 12a two consecutive uncompressed frames, frame (1) and frame (2), are shown, or rather, the trailing part of frame (1) and the heading part of frame (2) are shown. The criterions on which the decision is based to compress the two frames, and on which the length of the compression is decided, has been described above. FIG. 12b shows the resulting compressed frame. As can be seen from FIGS. 12a and 12b, the length $t_1$, encompassing the trailing part of frame (1) from sample "a" and the heading part of frame (2) up to sample "b", has been time compressed to the length $t_2$, i.e. the length $t_2$ between sample "a" and "b" in FIG. 12b is less than the length $t_1$, in FIG. 12a. Further details of the processing steps performed by the overall process and the sub-processes described above with reference to FIGS. 4-9, as well as details relating to the diagrams illustrated by FIGS. 10-12, will now be described below.

According to the invention, the combined timing recovery and lost frame substitution relies, inter alia, on the time expansion of a signal frame. Time expansion of signal frames is performed by the decision logic in blocks 390, 470, and 550 in FIGS. 6, 7, and 8, respectively. Time expansion is also needed as a step in the time compression performed in block 290 of FIG. 5 in a way that is specified in more detail later.

The time expansion called for in these blocks is basically identical. At least two methods for time expansion can be used: expansion of a signal frame by use of a modified oscillator model, and expansion of a signal frame by use of pitch prediction. Common for these methods is that they result in a time expansion of the signal frame having a signal dependent number of samples. These samples are such that several, advantageously 10, samples at the end of the expanded frame will equate with a set of samples at the end of the unexpanded signal frame, with exception for a known gain factor. This allows the method of the invention, by means of the gain scale correction for the next frame (block 300 of FIGS. 5 and 6), to ensure a continuation of the playback of the next frame without any discontinuities, provided that this next frame emerges at the receiver during playback of the samples belonging to the time expanded part of the currently played signal frame.

For the purpose of performing time expansion in the context of the combined timing recovery and lost frame substitution in accordance with an embodiment of the present invention, a new oscillator model adapted for the present invention is defined in accordance with the following:

The segments stored in the oscillator codebook are all trailing segments of the signal frame to be expanded. The number of states and segments in the codebook, are dependent on the number of fractional delay values used, e.g. 0, ¼, ½, ¾ sample. A re-sampling is made for each delay value. The first ($N_G$-$N_H$) states and its corresponding segments are related to the first fractional delay, the next ($N_G$-$N_H$) states and its corresponding segments are related to the next fractional delay etc. The first codebook entry for a fractional delay holds the $N_G$ last samples of the corresponding re-sampled signal segment, the n'th codebook entry holds the $N_G$+(n−1) last samples of the corresponding re-sampled signal segment, and the last codebook entry stores the $N_H$ last samples of the corresponding re-sampled signal segment. For speech signals, $N_G$ is advantageously 20 samples and $N_H$ is advantageously 120 samples. The method is used correspondingly when expanding the header part of a signal frame, wherein the segments stored in the codebook are heading segments of the signal frame.

Each segment of the codebook is connected with a state with a fixed length of $N_I$, samples, wherein each state corresponds to an entry of the codebook. The state connected with the first segment consists of the $N_G$+1 to $N_G$+$N_I$ last samples of the signal frame, and, generally, the state connected with the n'th segment consists of the $N_G$+(n−1)+1 to $N_G$+(n−1)+$N_I$ last samples of the corresponding re-sampled signal frame. For speech signals $N_I$, is advantageously 10.

In a simple implementation, re-sampling can be limited to zero. However, by the use of a re-sampling scheme, segments with fractional delay can be obtained. To avoid discontinuity at the continuation into the next frame, future frames are fractionally re-sampled with the same fraction. At first it may seem an excessive computational burden to re-sample a large number of future frames as a result of a single expansion process. However as will be explained later, fractional delays can also be exploited in the time compression and merging processes. The computational load of maintaining fractionally delayed sampling tracks is then justified from the improved performance of all three operations, and a fraction, such as ½, ⅓, or ¼, may in some applications result in an improvement in performance that justifies the increased computational complexity.

An alternative to having the oscillator always select the segment whose state vector best matches the $N_I$ last samples of the signal frame, using a squared error measure, is to apply a free gain factor to the states of the codebook before matching the N9 last samples of the signal frame with the states. If a match is achieved after such an operation, the segment of the matching state is read out from the oscillator codebook and multiplied with that gain. As previously described with reference to the sub-processes above, the gain factor of the time expanded part of the signal frame is registered. Advantageously, the two alternative methods for state matching described above are combined by selecting the matching method using the free gain factor whenever this leads to a gain factor less than 1.0, and selecting the matching method without any use of a free gain factor, i.e. with a fixed gain of 1.0, otherwise.

The matching of state vectors of the codebook to the $N_I$ last samples of the signal frame do not, generally, lead to a perfect match. Therefore, a discontinuity of the signal will most likely be introduced between the original signal frame and its continuation, i.e. its time expanded part. As described above when referring to state of the art methods, it is previously known to use linear predictive smoothing to reduce this discontinuity. However, according to the present invention, a computationally simpler alternative to linear predictive smoothing exists as will be explained in the following. The selected state vector, eventually with an optimized gain factor, is a close approximation to the $N_f$ last samples of the signal frame from which the expansion should follow without any discontinuity. By performing a smooth overlap-add transition between the $N_1$ last samples of the signal and the matching state vector, a transition to the expansion segment without discontinuity is accomplished. Especially in the embodiment of FIG. 3, this computationally simpler method provides an advantageous alternative to linear predictive smoothing.

Preferably, a constraint is applied on the segment selection of the oscillator: when iterated, the oscillator is prohibited to select the same segment for readout twice in a row. The reason for this constraint is to avoid degradation due to introduced periodicity of the expanded signal. Alternatively, time expansion can be performed with classical pitch prediction, or pitch prediction with fractional pitch lag, without departing from the scope of the idea of the present invention.

According to the invention, the lost frame substitution is finalised by merging of an expansion segment with a future signal frame, which is performed in block 480 of FIG. 7. At least two methods for merging can be used: merging by overlap-add with max correlation fitting, or merging by oscillator modeling. Common for these methods is that they conduct a time alignment of the future signal frame with the expansion segment to minimize the discontinuity of the transition between the two. This time alignment can have a resolution that is a fraction of a sample.

In the present invention, an overlap-add merging of two segments over m samples consists of the following:
multiplying the trailing m samples of the first segment with a smooth window that starts with the value 1.0 and ends with the value 0.0;
multiplying the m leading samples of the second segment with a smooth window that is defined as one minus the first window; and finally
overlapping the two segments by their windowed parts and adding them.

Advantageously, the trailing and leading parts of a 2m samples Hanning window can be used for this purpose.

The overlap-add merging uses max-correlation fitting. The max-correlation fitting vary the overlap m and allow a free gain parameter to be multiplied to the second segment, such that the average squared error distance between samples of the two overlapping segments is minimized prior to windowing. By use of the same resampling scheme as during the expansion procedure, the max-correlation fitting can be optimized even for overlaps with fractional accuracy.

The use of a free gain factor in the optimized fitting is optional. If a free gain factor is utilized, it is registered in block 490, in order for enabling the following frame to be subject to an adequate gain scale correction.

Alternatively, in an embodiment of the present invention, merging is performed with the use of an Oscillator model. This merging is performed in a manner equivalent to the time-scaling less than one as described in the above-mentioned article by G. Kubin and W. B. Kleijn. When using an oscillator model for merging, the oscillator model replaces the codebook corresponding to the first signal frame with the codebook corresponding to the second signal frame. The result being a state fitted transition between segments. The oscillator model can also advantageously work with fractional pitch and gain scaled states and signal segments. Replacing the overlap-add max-correlation fitting with the oscillator model for performing the merging procedure, is a possible alternative which does not depart from the scope of the idea of the present invention.

According to the invention, the time compression of a sequence of signal frames is carried out iteratively: each iteration compresses two signal frames into one signal frame, with a length between the length of the shortest of the two signal frames and the sum of the length of the two signal frames, the resulting length depending on the success of the compression. The compression of two signal frames is obtained using the same processing steps as used when performing the described merging procedure, with the exception that the compressed signal frame undergoes a merging only if this merging meets a threshold, which threshold preferably is dependent on the classification of the signal frames. Otherwise, if this threshold cannot be met, the attempt to compress two signal frames results in a combined signal frame that is simply the concatenation of the two signal frames. The definition of the threshold depends on the merging method used. When oscillator modeling is used, the threshold is in terms of a maximum of the minimized error in the state-fitting. When the merging is accomplished with overlap-add max-correlation fitting, the threshold is in terms of a minimum of the maximized correlation coefficient.

The max-correlation fitting is performed in accordance with what has been described above. Advantageously, a threshold for the maximized correlation coefficient between 0.7 and 0.9 can be used for voiced speech segments. For the perception of the speech signal, it is advantageous to avoid time compression of unvoiced segments. In the described structure this can be accomplished by a threshold for the maximized correlation coefficient above one for these signal frames. Signal frames containing silence can be given a threshold of zero. When time compressing two signal frames of different class dependent thresholds, the threshold for compression is always the larger of the two thresholds.

Preferably, this threshold is checked in order to avoid maximization when it is given afore hand that the threshold cannot be met, but also when it is given afore hand that the threshold can be met even with complete overlap of the segments.

Preferably, the threshold for compression is decreased when the jitter buffer approach overflow. This leads to a faster readout from the jitter buffer.

As understood by persons skilled in the art, the inventive method is readily implemented using a microprocessor, e.g. a Digital Signal Processor, which microprocessor operates on a memory, e.g. a RAM memory. The signal segment used by the inventive method are stored in, and retrieved from, this memory.

Even though the invention has been described with reference to specific exemplifying embodiments, many different alterations, modifications and the like will become apparent for those skilled in the art. The desdribed embodiments are therefore not intended to limit the scope of the invention, as defined by the appended claims.

The invention claimed is:

1. A method for manipulating a sequence of digitized sound signal frames of a sound signal received from a packet switched network, the method including:
storing sound data packets from the packet switched network in a jitter buffer;
decoding sound signal frames from the sound data packets of the jitter buffer;
performing real-time observations on the number of packets in the jitter buffer; and
expanding a decoded first frame, if the real-time observations indicate a state of the jitter buffer close to underflow, by producing a frame portion and adding the produced frame portion to the decoded first frame, wherein the produced frame portion represents a part of the sound signal that is different from the part represented by the decoded first frame.

2. The method of claim 1, wherein
the produced frame portion is produced to be contiguous with the decoded first frame to be expanded; and a following decoded second frame is provided to be contiguous with said produced frame portion.

3. The method of claim 1, wherein a time length of the produced frame portion is different from the time length of the decoded first frame to be expanded.

4. The method as claimed in claim 3, wherein the time length of the produced frame portion is chosen such that it provides a smooth transition to said following second frame.

5. The method as claimed in claim 3, wherein the time length of the produced frame portion is chosen based upon a requirement to fulfill a signal fitting criteria with respect to signal characteristics of the sound signal.

6. The method as claimed in claim 3, wherein a resolution of the time length of the produced frame portion is a fraction of the time between two samples of said sound signal, thereby providing an improved signal fitting quality for a smooth transition from the decoded first frame to the produced frame portion.

7. The method as claimed in claim 1, further including matching a true state of a trailing part of the decoded first frame with an entry state of a codebook, the codebook having entries consisting of different states formed by vectors of samples and storing a corresponding signal segment for each entry state, wherein the step of producing a frame portion includes reading out a signal segment from said codebook that corresponds to the entry state that have been matched with said true state.

8. The method as claimed in claim 7, wherein different signal segments of said codebook have different time lengths, thereby enabling continuous transition from the time expanded signal frame to a consecutive signal frame.

9. The method as claimed in claim 7, wherein time delays between states of said entries in said codebook are incremental delays with a resolution of a fraction of a time between two samples.

10. The method as claimed in claim 7, wherein the states of said codebook are scaled in order to improve the matching with said true state, and wherein a trailing part of the signal segment read out from the codebook is scaled to provide a smooth transition to said following second frame.

11. The method as claimed in claim 1, further including:
merging a decoded first frame with a following decoded second frame, if the real-time observations indicate a state of the jitter buffer close to overflow, by merging a heading segment of the first frame with a trailing segment of the second frame using overlap-add, wherein a time-shift of one of the frames is employed for optimizing the matching of the overlapping part of the two segments.

12. The method as claimed in claim 11, wherein said time-shift has a resolution of a fraction of a time between two samples.

13. The method as claimed in claim 11, wherein said heading segment is multiplied with a suitable gain to further optimize the matching with said trailing segment at the overlapping part, after which a smooth transition back to unity gain is performed in order to avoid sound signal discontinuities.

14. A receiver unit for manipulating a sequence of digitized sound signal frames of a sound signal received from a packet switched network, the receiver including
a jitter buffer, storing sound data packets from the packet switched network;
a sound decoder for decoding sound signal frames from the sound data packets of the jitter buffer;
a timing recovery processing unit for performing real-time observations on the number of packets in the jitter buffer; and
the timing recovery processing unit being configured for expanding a decoded first frame, if the real-time observations indicate a state of the jitter buffer close to underflow, by producing a frame portion and adding the produced frame portion to the decoded first frame, wherein the produced frame portion represents a part of the sound signal that is different from the part represented by the decoded first frame.

15. The receiver of claim 14, wherein
the produced frame portion is produced to be contiguous with the decoded first frame to be expanded; and
a following decoded second frame is provided to be contiguous with said produced frame portion.

16. The receiver of claim 14, wherein a time length of the produced frame portion is different from the time length of the decoded first frame to be expanded.

17. The receiver as claimed in claim 16, wherein the time length of the produced frame portion is configured such that it provides a smooth transition to said following second frame.

18. The receiver as claimed in claim 16, wherein the time length of the produced frame portion is configured based upon a requirement to fulfill a signal fitting criteria with respect to signal characteristics of the sound signal.

19. The receiver as claimed in claim 16, wherein a resolution of the time length of the produced frame portion is a fraction of the time between two samples of said sound signal, thereby providing an improved signal fitting quality for a smooth transition from the decoded first frame to the produced frame portion.

20. The receiver as claimed in claim 14, further including a codebook, wherein the timing recovery processing unit is configured for matching a true state of a trailing part of the decoded first frame with an entry state of the codebook, the codebook having entries consisting of different states formed by vectors of samples and storing a corresponding signal segment for each entry state, wherein the producing of a frame portion includes reading out a signal segment from said codebook that corresponds to the entry state that have been matched with said true state.

21. The receiver as claimed in claim 20, wherein different signal segments of said codebook have different time lengths, thereby enabling continuous transition from the time expanded signal frame to a consecutive signal frame.

22. The receiver as claimed in claim 20, wherein time delays between states of said entries in said codebook are incremental delays with a resolution of a fraction of a time between two samples.

23. The receiver as claimed in claim 20, wherein the states of said codebook are scaled in order to improve the matching with said true state, and wherein a trailing part of the signal segment read out from the codebook is scaled to provide a smooth transition to said following second frame.

24. The receiver as claimed in claim 14, wherein the timing recovery processing unit is further configured for
merging a decoded first frame with a following decoded second frame, if the real-time observations indicate a state of the jitter buffer close to overflow, by merging a heading segment of the first frame with a trailing segment of the second frame using overlap-add, wherein a time-shift of one of the frames is employed for optimizing the matching of the overlapping part of the two segments.

25. The receiver as claimed in claim 24, wherein said time-shift has a resolution of a fraction of a time between two samples.

26. The receiver as claimed in claim 24, wherein said heading segment is multiplied with a suitable gain to further optimize the matching with said trailing segment at the overlapping part, after which a smooth transition back to unity gain is performed in order to avoid sound signal discontinuities.

* * * * *